(12) United States Patent
Zivkovic et al.

(10) Patent No.: US 12,450,518 B2
(45) Date of Patent: Oct. 21, 2025

(54) EVALUATING ON-DEVICE MACHINE LEARNING MODEL(S) BASED ON PERFORMANCE MEASURES OF CLIENT DEVICE(S) AND/OR THE ON-DEVICE MACHINE LEARNING MODEL(S)

(71) Applicant: Google LLC, Mountain View, CA (US)

(72) Inventors: Dragan Zivkovic, Sunnyvale, CA (US); Akash Agrawal, San Jose, CA (US); Françoise Beaufays, Mountain View, CA (US); Tamar Lucassen, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 1208 days.

(21) Appl. No.: 17/215,588

(22) Filed: Mar. 29, 2021

(65) Prior Publication Data
US 2022/0309389 A1      Sep. 29, 2022

(51) Int. Cl.
*G06N 20/00*     (2019.01)
*G06N 5/04*      (2023.01)

(52) U.S. Cl.
CPC ............. *G06N 20/00* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 9,396,092 B1 * | 7/2016 | Kuo | G06F 8/38 |
| 10,390,170 B1 * | 8/2019 | Karkkainen | G06N 3/08 |
| 11,677,770 B2 * | 6/2023 | Baldini Das Neves | G06N 5/022 726/23 |
| 12,118,460 B2 * | 10/2024 | Zaidy | G06N 3/105 |

(Continued)

FOREIGN PATENT DOCUMENTS

CN       105224449 X       12/2017

OTHER PUBLICATIONS

European Patent Office, Intention to Grant issued in Application No. 21848341.0; 61 pages; dated Jul. 4, 2024.

(Continued)

*Primary Examiner* — Haimei Jiang
(74) *Attorney, Agent, or Firm* — Gray Ice Higdon

(57) ABSTRACT

Implementations disclosed herein are directed to systems and methods for evaluating on-device machine learning (ML) model(s) based on performance measure(s) of client device(s) and/or the on-device ML model(s). The client device(s) can include on-device memory that stores the on-device ML model(s) and a plurality of testing instances for the on-device ML model(s). When certain condition(s) are satisfied, the client device(s) can process, using the on-device ML model(s), the plurality of testing instances to generate the performance measure(s). The performance measure(s) can include, for example, latency measure(s), memory consumption measure(s), CPU usage measure(s), ML model measure(s) (e.g., precision and/or recall), and/or other measures. In some implementations, the on-device ML (Continued)

model(s) can be activated (or kept active) for use locally at the client device(s) based on the performance measure(s). In other implementations, the on-device ML model(s) can be sparsified based on the performance measure(s).

18 Claims, 6 Drawing Sheets

(56) References Cited

U.S. PATENT DOCUMENTS

| | | | | |
|---|---|---|---|---|
| 2012/0011378 | A1* | 1/2012 | Dalton | G06F 11/3062 |
| | | | | 713/300 |
| 2015/0017928 | A1* | 1/2015 | Griesing | H04B 17/0085 |
| | | | | 455/67.14 |
| 2015/0081598 | A1* | 3/2015 | Depizzol | G06F 8/35 |
| | | | | 706/12 |
| 2015/0224449 | A1* | 8/2015 | Kuo | B01D 61/58 |
| | | | | 210/201 |
| 2016/0283356 | A1* | 9/2016 | Waldman | G06F 11/3698 |
| 2017/0339178 | A1* | 11/2017 | Mahaffey | G06F 11/3006 |
| 2018/0181877 | A1* | 6/2018 | Wu | G06F 16/2455 |
| 2018/0287926 | A1* | 10/2018 | Williams | H04L 41/082 |
| 2019/0005947 | A1* | 1/2019 | Kim | G10L 15/22 |
| 2019/0180174 | A1* | 6/2019 | Koswatta | G06N 3/065 |
| 2019/0205745 | A1* | 7/2019 | Sridharan | G06F 9/5077 |
| 2019/0325291 | A1* | 10/2019 | Gokmen | G06N 3/045 |
| 2020/0286487 | A1* | 9/2020 | Abdulkader | G10L 15/30 |
| 2020/0358646 | A1* | 11/2020 | Lincoln | H04J 11/0079 |
| 2020/0410389 | A1* | 12/2020 | Jain | G06F 9/44505 |
| 2021/0081836 | A1* | 3/2021 | Polleri | G06F 8/77 |
| 2021/0104223 | A1* | 4/2021 | Beaufays | G10L 13/047 |
| 2021/0334704 | A1* | 10/2021 | Schall | G05B 17/02 |
| 2023/0252355 | A1* | 8/2023 | Tao | G06N 3/045 |
| | | | | 706/12 |

OTHER PUBLICATIONS

European Patent Office; Communication issued in Application No. 24215266.8; 11 pages; dated Jan. 17, 2025.

European Patent Office; International Search Report and Written Opinion issued in Application No. PCT/US2021/063044; 14 pages; dated Apr. 19, 2022.

Testsigma; "Everything you need to know about Mobile Testing I An essential guide to Mobile Testing" Testsigma Technologies Inc.; retrieved from the URL https://testsigma.com/mobile-testing; 18 pages; dated retrieved Oct. 1, 2021.

Soucoup, M. et al.; "Perform automated testing on thousands of mobile devices simultaneously" Visual Studio App Center. 2 pages; dated Jun. 9, 2020.

* cited by examiner

EVALUATING ON-DEVICE MACHINE LEARNING MODEL(S) BASED ON PERFORMANCE MEASURES OF CLIENT DEVICE(S) AND/OR THE ON-DEVICE MACHINE LEARNING MODEL(S)

BACKGROUND

Federated learning of machine learning (ML) model(s) is an increasingly popular ML technique for training ML model(s). In traditional federated learning, an on-device ML model is stored locally on a client device of a user, and a global ML model, that is a cloud-based counterpart of the on-device ML model, is stored remotely at a remote system (e.g., a cluster of servers). The client device, using the on-device ML model, can process user input detected at the client device to generate predicted output, and can compare the predicted output to ground truth output to generate a client gradient. Further, the client device can transmit the client gradient to the remote system. The remote system can utilize the client gradient, and optionally additional client gradients generated in a similar manner at additional client devices, to update weights of the global ML model. The remote system can transmit the global ML model, or updated weights of the global ML model, to the client device. The client device can then replace the on-device ML model with the global ML model, or replace the weights of the on-device ML model with the updated weights of the global ML model, thereby updating the on-device ML model.

Notably, these federate learning techniques can be device independent. For example, a first client device having a first set of device characteristics (e.g., memory consumption, CPU usage, latency, etc.) and a second client device having a distinct, second set of device characteristics may share corresponding instances of the same on-device ML model(s) based on the first client device and the second client device participating in federated learning of the on-device ML model(s). However, a given instance of an on-device ML model that is best suited for the first client device may not be best suited for the second client device based at least in part of the different sets of device characteristics. As a result, the given instance of the on-device ML model may perform sub-optimally and unnecessarily waste computational resources of the second client device. This problem is compounded due to different client devices having different device characteristics being introduced by different manufacturers at an increasingly rapid pace.

SUMMARY

Implementations disclosed herein are directed to evaluating one or more on-device machine learning (ML) models based on a plurality of performance measures of a corresponding client device and/or one or more of the on-device ML models. Each of the corresponding client devices can include on-device memory that stores one or more of the on-device ML models and a plurality of testing instances for one or more of the on-device ML models. Further, the corresponding client devices can process, using one or more of the on-device ML models, the plurality of testing instances to generate the plurality of performance measures for each of the plurality of testing instances. The plurality of performance measures, for a given testing instance of the plurality of testing instances, can include device-specific performance measures and/or model-specific performance measures. The device-specific performance measures can include, for example, a latency measure, a memory consumption measure, a CPU usage measure, and/or other device-specific measures. The model-specific performance measures can include one or more ML model measures that are based on a type of one or more of the ML models that are utilized to process the plurality of testing instances. In some implementations, one or more of the on-device ML models can be activated (or kept active) for use locally at the corresponding client devices based on the plurality of performance measures. In other implementations, one or more of the on-device ML models can be sparsified based on the plurality of performance measures.

For example, assume a given client device has on-device memory storing an on-device automatic speech recognition (ASR) model, and a plurality of testing instances for the ASR model. In this example, testing instance input for each of the plurality of testing instances can include a segment of audio data, and testing instance output for each of the plurality of testing instances can include a ground truth transcription corresponding to a spoken utterance captured in the segment of the audio data. Further, the given client device can process, using the on-device ARS model, the segment of the audio data for a first testing instance to generate one or more speech hypotheses as predicted output. In generating the device-specific measures for the first testing instance, the given client device can determine a latency measure associated with the processing of the segment of the audio data, a memory consumption measure associated with the processing of the segment of the audio data, a CPU usage measure associated with the processing of the segment of the audio data, and/or other device-specific measures associated with the processing of the segment of the audio data. Further, in generating the model-specific measures the given client device can determine an ASR accuracy measure associated with comparing one or more of the speech hypotheses for the segment of the audio data to the ground truth transcription for the segment of the audio data, an ASR stability measure associated with a streaming transcription for the segment of the audio data in implementations where the given client device streams the transcription to a display, and/or other ASR performance measures. The given client device can process the remaining testing instances in the same or similar manner to generate corresponding performance measures for those testing instances. Although the above working example is described with respect to the on-device ASR model, it should be understood that is for the sake of example and is not meant to be limiting and that the techniques described herein can be utilized to evaluate any on-device ML model.

In some implementations, the given client device can determine whether to activate (or keep active) a given ML model based on comparing each of the plurality of performance measures for each of the testing instances to a corresponding performance measure threshold. Continuing with the above working example, the latency measure for the first testing instance can compared to a corresponding latency threshold, the memory consumption measure for the first testing instance can compared to a corresponding memory consumption threshold, the CPU usage measure for the first testing instance can compared to a corresponding CPU usage threshold, the ASR accuracy measure for the first testing instance can compared to a corresponding ASR accuracy threshold, the ASR stability measure for the first testing instance can compared to a corresponding ASR stability threshold, and/or other performance measures for the first testing instance can be compared to corresponding performance thresholds. The given client device can process the remaining performance measures for the remaining testing instances in the same or similar manner. In additional or alternative implementations, the given client device can determine whether to activate (or keep active) a given ML model based on comparing some statistical measure for the plurality of performance measures for each of the testing instances to a corresponding performance measure threshold. Continuing with the above working example, an average latency measure for the plurality of testing instance can compared to a corresponding latency threshold, an average memory consumption measure for the plurality of testing instance can compared to a corresponding latency threshold, and so on for the remaining performance measures generated based on processing the plurality of testing instances. In additional or alternative implementations, the given client device can transmit the plurality of training instances to a remote system, and the remote system can determine whether to activate (or keep active) a given ML model based on based on comparing each of the plurality of performance measures for each of the testing instances to a corresponding performance measure threshold.

In some implementations, the given client device or the remote system can determine to activate (or keep active) a given ML model in response to determining that the plurality of performance measures satisfy the corresponding performance measures thresholds. In additional or alternative implementations, the given client device or the remote system can determine to sparsify a given ML model in response to determining that one or more of the plurality of performance measures fail to satisfy the corresponding performance measures thresholds. The given ML model can be sparsified by removing connections, layers, parameters, and/or other features of the given ML model, thereby effectively reducing the size of the given ML model. In sparsifying the given ML model, the device-specific performance measures can be reduced (e.g., less latency, less memory consumption, less CPU usage, etc.). However, the model-specific performance measures may be reduced (e.g., less accuracy in precision and/or recall). Notably, the given ML model can be sparsified with varying degrees of sparsity. For example, in response to determining one or more of the plurality of performance measures do not satisfy corresponding performance measure thresholds for the given ML model, the given ML model can be sparsified with a first degree of sparsity by removing first connections, first layers, and/or first parameters. Further, in response to subsequently determining one or more of a plurality of additional performance measures for the sparsified instance of the given ML model do not satisfy corresponding performance measure thresholds, the given ML model can be sparsified with a second degree of sparsity by further removing second connections, second layers, and/or second parameters. Moreover, in response to subsequently determining one or more of a plurality of further additional performance measures for the further sparsified instance of the given ML model do not satisfy corresponding performance measure thresholds, the given ML model can be further sparsified with a third degree of sparsity by yet further removing third connections, third layers, and/or third parameters. Accordingly, in sparsifying the given ML model, the given client device and/or the remote system seek to balance performance and sparsity of the given ML model for the given client device until the given ML model performs optimally at the given client device.

In some implementations, the given client device processes the plurality of testing instances in response to determining one or more client device conditions are satisfied. The one or more client device conditions can include, for example, one or more of a time of day, a day of week, that the given client device is charging, that the given client device has at least a threshold state of charge, that a temperature of the given client device is less than a temperature threshold, or that the given client device is not being held by a user. In other words, the given client device may not generate the plurality of performance measures while a user of the given client device is actively using the given client device. In some versions of those implementations, the given client device processes the plurality of testing instances the first time the one or more client device conditions are satisfied subsequent to the given client device being configured by a user of the given client device (e.g., after the user purchases the given client device).

In additional or alternative implementations, the given client device processes the plurality of testing instances in response to determining one or more of the client device conditions are satisfied and one or more evaluation conditions are satisfied. The one or more evaluation conditions can include, for example, one or more of a threshold quantity of system updates that have been performed at the given client device, a threshold quantity of memory that has been utilized or consumed by the given client device, a threshold duration of time since a plurality of performance measures for the given ML model that is active were generated at the given client device, and/or other evaluation conditions. In other words, subsequent to initially activating the given ML model at the given client device, the given ML model can be periodically evaluated to ensure the balance between performance and sparsity of the given ML model for the given client device is maintained.

In some implementations, the given client device can have a set of device characteristics. The set of device characteristics can include hardware characteristics (e.g., a type of memory available, a quantity of memory available, a type of processors, a quantity of processors, etc.), software characteristics (e.g., firmware, operating system, etc.), a manufacturer characteristic (e.g., an indication of a manufacturer of the given client device), and/or other device characteristics. The plurality of performance measures generated by the given client device may influence whether to activate (or keep active) a given ML model at additional client devices that share the same set of device characteristics, but may not influence whether to activate (or keep active) the given ML model at other client devices that do not share the same set of device characteristics. Additionally, or alternatively, the plurality of performance measures generated by the additional client devices that share the same set of device characteristics with the given client device may influence whether to activate (or keep active) the given ML model at the given client device. For example, the plurality of performance measures generated by a group of client devices that each have the same set of device characteristics can be transmitted to a remote system, and the remote system can determine whether to activate (or keep active) or sparsify a corresponding given ML model stored on-device at each of the client devices of the group. Notably, even if a given client device is not in the group that generates the plurality of performance characteristics but shares the same set of device characteristics as the client devices of the group, the remote system can determine whether to activate (or keep active) or sparsify the corresponding given ML model stored on-device at the given client device.

By using the techniques described herein, various technical advantages can be achieved. As one non-limiting example, by storing the ML model(s) and the plurality of testing instances for the ML model(s) in on-device memory of the client device(s), consumption of network resources can be reduced by obviating the need to transmit the ML model(s) and the plurality of testing instances to the client device(s). For instance, the client device(s) can already have the ML model(s) and the plurality of training instances stored in the on-device memory when the client device is purchased. As another non-limiting example, by activating (or keeping active) or sparsifying the ML model(s) based on the processing of the plurality of testing instances at the client device(s), consumption of computational resources can be reduced by balancing the performance and the sparsity of the ML model(s). For instance, the ML model(s) can be the optimal ML model(s) for use at the client device(s) based on the device characteristics of the client device(s). As yet another non-limiting example, by activating (or keeping active) or sparsifying the ML model(s) based on the processing of the plurality of testing instances at other client device(s), consumption of computational resources can be reduced by leveraging the plurality of performance measures generated by the other client device(s) that share the same device characteristics. Accordingly, the client device(s) are improved and consumption of computational and/or network resources reduced.

The above description is provided as an overview of some implementations of the present disclosure. Further description of those implementations, and other implementations, are described in more detail below.

DETAILED DESCRIPTION

Figure 1A:
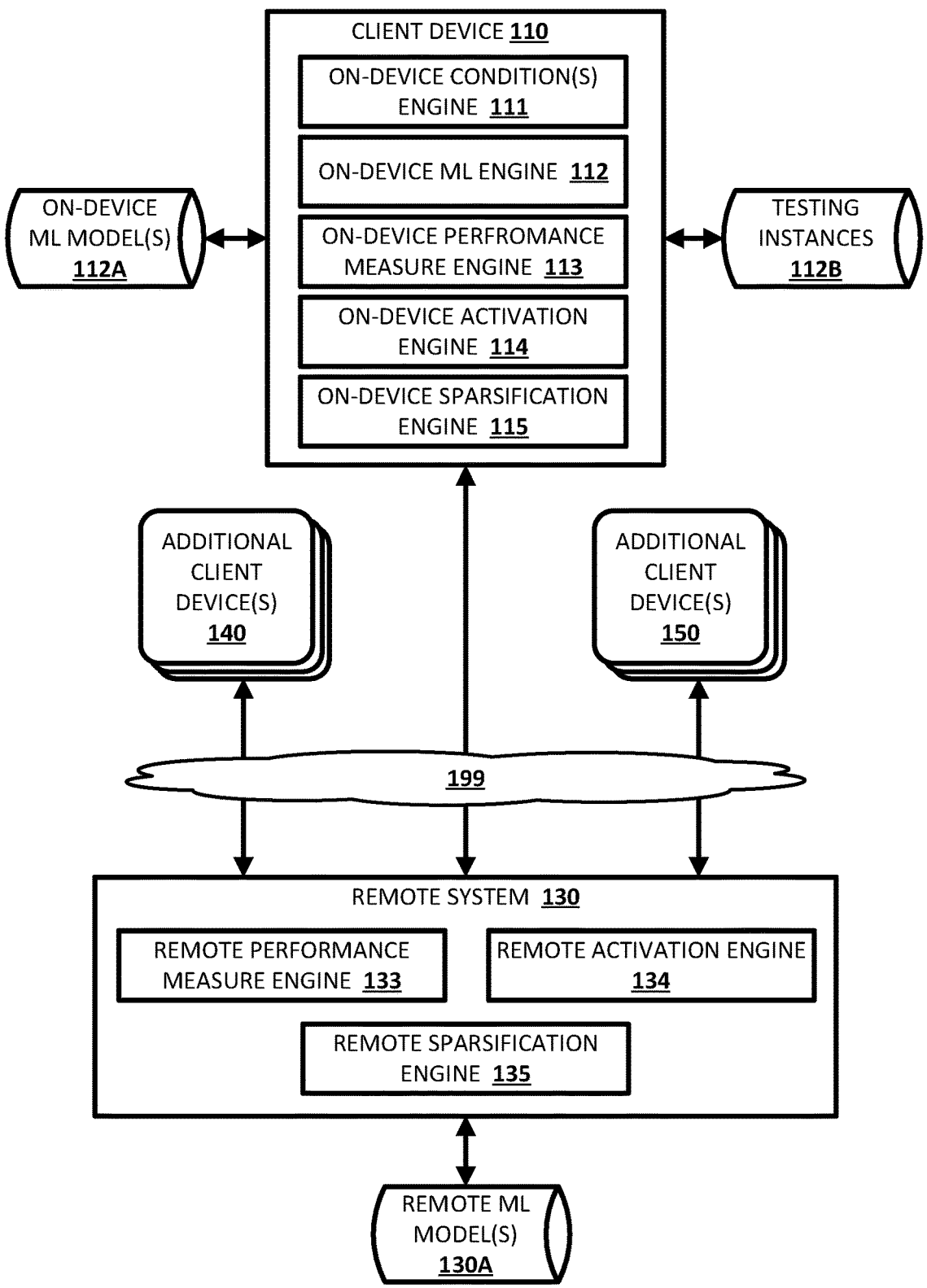
FIG. 1A depicts a block diagram of an example environment that demonstrates various aspects of the present disclosure, and in which implementations disclosed herein can be implemented.
Figure 1B:
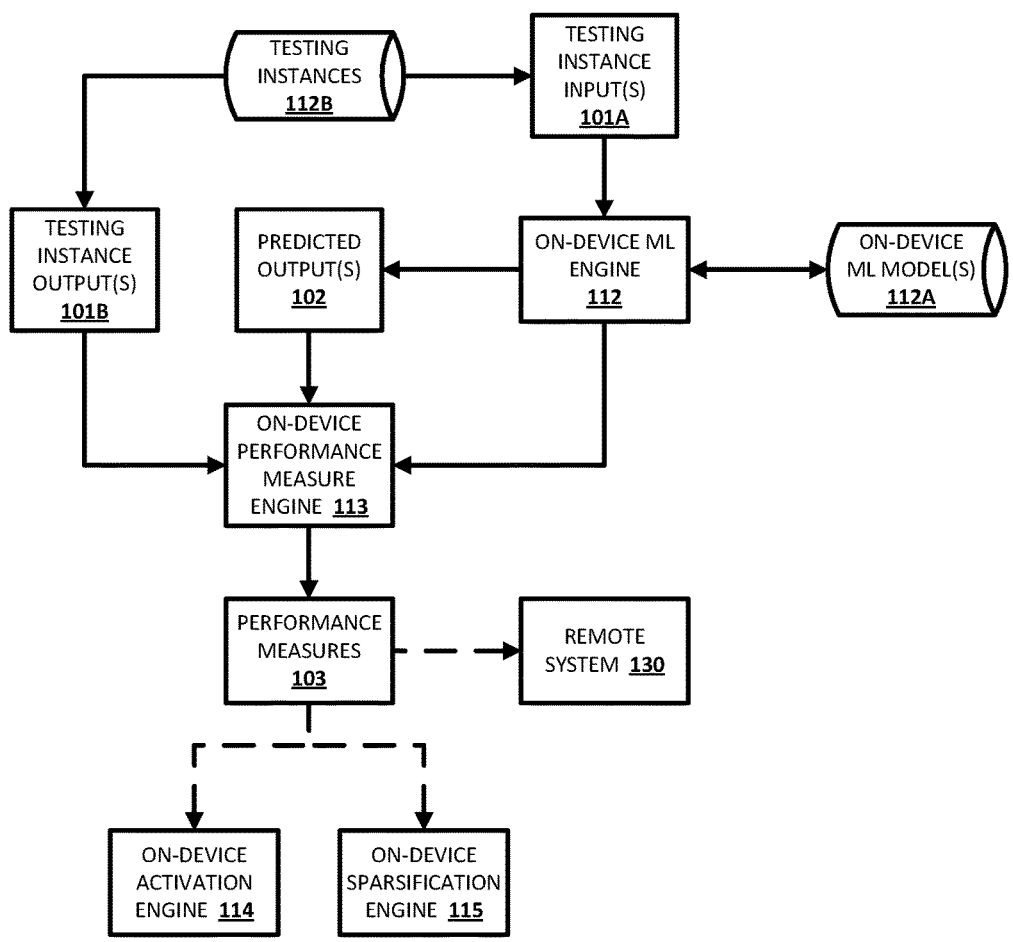
FIG. 1B depicts an example process flows that demonstrate various aspects of the present disclosure, in accordance with various implementations.

FIG. 1A depicts a block diagram of an example environment that demonstrates various aspects of the present disclosure. A client device 110, a remote system 130, a first group of additional client devices 140, and a second group of additional client devices 150 are illustrated in FIG. 1A. The client device 110, each of the client devices in the first group of additional client devices 140, and each of the client devices in the second group of additional client devices 150 can be communicatively coupled with the remote system 130 over one or more networks 199 as depicted in FIG. 1.

The one or more networks 199 can include, for example, any combination of local area networks (LANs), wide area networks (WANs), and/or any other type of networks.

The client device 110 can include, in various implementations, an on-device conditions engine 111, an on-device machine learning (ML) engine 112, an on-device performance measure engine 113, an on-device activation engine 114, an on-device sparsification engine 115, and/or other on-device engines. Further, the client device 110 can include on-device memory storing one or more on-device ML models (e.g., in on-device ML model(s) database 112A), a plurality of testing instances (e.g., in testing instances 112B), and/or other on-device data. The remote system 130 can include, for example, a remote performance measure engine 133, a remote activation engine 134, and a remote sparsification engine 135. Further, the remote system 130 can include remote memory storing one or more remote ML models (e.g., in remote ML model(s) database 130A). Moreover, and although not depicted in FIG. 1 for the sake of simplicity, each of the client devices of the first group of additional client devices 140 and the second group of additional client devices 150 can include one or more corresponding instances of the on-device engines and corresponding on-device memory described with respect to the client device 110 of FIG. 1 (e.g., as described with respect to FIG. 4).

The client device 110 and the additional client devices 140 and 150 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

In various implementations, the client device 110 can generate a plurality of performance measures for a given on-device ML model stored in the on-device model(s) database 112A based on the plurality of testing instances stored in the testing instances database 112B. In some implementations, and as described herein, the given on-device ML model may be dormant at the client device 110 (i.e., not available for use locally at the client device 110), and activated or sparsified based on the plurality of performance measures generated based on the plurality of testing instances. In additional or alternative implementations, and as also described herein, the given on-device ML Model may be active at the client device 110 (i.e., available for use locally at the client device 110), and deactivated or sparsified based on the plurality of performance measures generated based on the plurality of testing instances.

In some implementations, the plurality of performance measures for the given on-device ML model can include device-specific performance measures and model-specific performance measures. For example, the device-specific performance measures can include a corresponding latency measure (e.g., in seconds or milliseconds), a corresponding memory consumption measure (e.g., a percentage of memory consumed overall or consumed based on processing the testing instances), a corresponding CPU usage measure (e.g., a percentage of CPU usage overall or used in processing the testing instances), and/or other corresponding performance measures associated with performance of the client device 110 in using the given on-device ML model to process each of the plurality of testing instances. Also, for example, the model-specific performance measures can include one or more corresponding measures associated with performance of the given on-device ML model that can be based on a type of the given on-device ML model. For instance, in implementations where the given on-device ML model is an on-device automatic speech recognition (ASR) model, the model-specific performance measures can include a corresponding ASR accuracy measure that is indicative of how accurate one or more speech hypotheses are for corresponding testing instances as described herein, a corresponding ASR stability measure that is indicative of how a stable a corresponding transcription is for one or more of the speech hypotheses are for the corresponding testing instances as described herein, and/or other corresponding ASR performance measures. Although the model-specific performance measures described above are described with respect to a given on-device ASR model, it should be understood that is for the sake of example and is not meant to be limiting. For instance, the techniques described herein can be utilized to generate model-specific performance measures for various disparate on-device ML models (e.g., described with respect to FIGS. 1B and 2). In other implementations, the plurality of performance measures for the given on-device ML model can include one of the device-specific performance measures or the model-specific performance measures.

Each of the plurality of testing instances stored in the testing instances database 112B can include testing instance input and testing instance output. Further, each of the plurality of testing instances stored in the testing instances database 112B can be one of multiple disparate types of testing instances that are associated with disparate types of ML models. For example, the plurality of testing instances can be audio-based testing instances that can be processed by a given audio-based on-device ML model to generate performance measures for the given audio-based on-device ML model, vision-based testing instances that can be processed by a given vision-based on-device ML model to generate performance measures for the given vision-based on-device ML model, text-based testing instances that can be processed by a given text-based on-device ML model to generate performance measures for the given text-based on-device ML model, and/or other types of testing instances for testing other types of on-device ML models. The testing instances and processing of the testing instances to generate the plurality of performance measures is described in more detail herein (e.g., with respect to the on-device performance measure engine 113 of FIGS. 1A and 1B).

In some implementations, the client device 110 can generate the plurality of performance measures for the given on-device ML model in response to the on-device condition(s) engine 111 determining one or more client device conditions are satisfied. The one or more client device conditions can include, for example, one or more of a time of day, a day of week, that the client device 110 is charging, that the client device 110 has at least a threshold state of charge, that a temperature of the client device 110 is less than a temperature threshold, or that the client device 110 is not being held by a user. In other words, the client device 110 may not generate the plurality of performance measures while a user of the client device 110 is actively using the client device 110.

Figure 3:
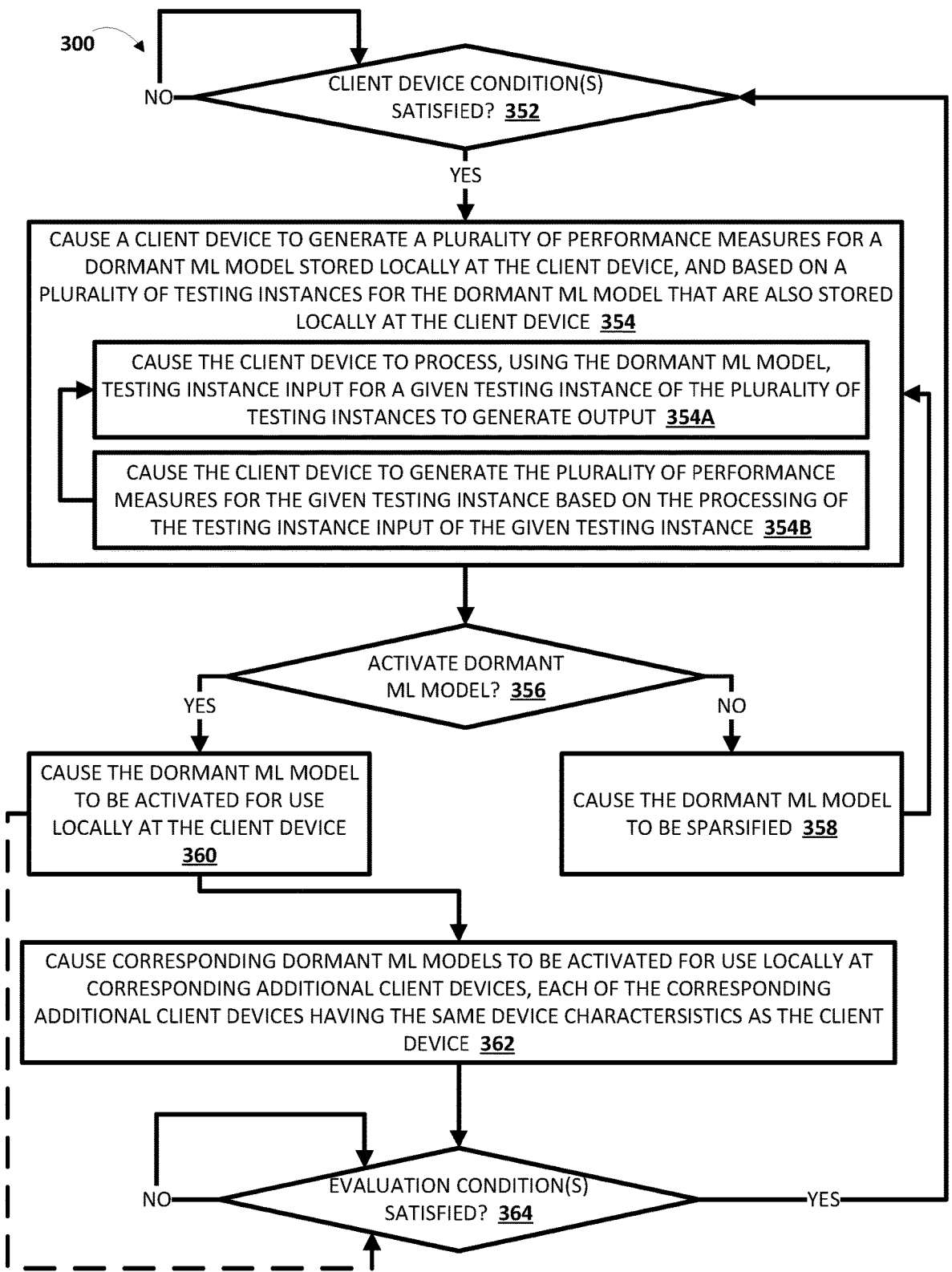
FIG. 3 depicts a flowchart illustrating an example method of causing performance measures to be generated by a client device for activating and/or evaluating on-device machine learning model(s), in accordance with various implementations.

In some versions of those implementations, a given ML model stored in the ML model(s) database 112A can be dormant, and the client device 110 can initially generate the plurality of performance measures to determine whether to activate or sparsify the given ML model based on the plurality of performance measures (e.g., described with respect to FIG. 3). In other words, the given ML model and the plurality of testing instances can already be stored in the on-device memory of the client device 110 when the client device 110 is acquired by a user (e.g., purchased), and the client device 110 can generate the plurality of performance measures the first time the one or more client device conditions are satisfied to determine whether to activate or sparsify the given ML model that is dormant in the on-device memory. In additional or alternative implementations, a given ML model stored in the ML model(s) database 112A can be active, and the client device 110 can subsequently generate a plurality of additional performance measures to determine whether to keep the given ML model active based on the plurality of additional performance measures or to sparsify the given ML model that is active at the client device 110 (e.g., as also described with respect to FIG. 3). In these implementations, the client device 110 can generate the plurality of additional performance measures in response to determining one or more evaluation conditions are satisfied. The one or more evaluation conditions can include, for example, one or more of a threshold quantity of system updates that have been performed at the client device 110, a threshold quantity of memory that has been utilized by the client device 110, a threshold duration of time since a plurality of performance measures for the ML model that is active were generated at the client device 110, and/or other evaluation conditions.

In generating the plurality of performance measures based on a given testing instance, the on-device ML engine 112 can process, using a given ML model, testing instance input for the given testing instance to generate predicted output, and the on-device performance measure engine 113 can generate the plurality of performance measures, for the given testing instance, based on the processing of the testing instance input. For example, and referring briefly to FIG. 1B, the client device 110 can obtain a given testing instance from the testing instances database 112B. The given testing instance can include one or more testing instance inputs 101A and one or more testing instance outputs 101B. The on-device ML engine 112 can process, using a given ML model stored in the on-device ML model(s) database 112A, the one or more testing instance inputs 101A to generate one or more predicted outputs 102. Further, the on-device performance measure engine 113 can generate a plurality of performance measures 103. For example, the on-device performance measure engine 113 can generate model-specific performance measures based on comparing the one or more testing instance outputs 101B to the one or more predicted outputs 101B, and can generate device-specific performance measures based on the processing of the one or more testing instance inputs 101A. Further, the on-device performance measure engine 113 can transmit the plurality of performance measures to one or more of the on-device activation engine 114, the on-device sparsification engine 115, and/or the remote system 130 based on the plurality of performance measures 103.

For example, assume that the given ML model stored locally at the client device 110 is an audio-based ML model. In this example, testing instant input for each of the plurality of testing instances can include a corresponding segment of audio data. Further, testing instance output for each of the plurality of testing instances may be based on a type of the audio-based ML model. For instance, the testing instance output can include: a ground truth transcription corresponding to the segment of the audio data of the testing instance input when the given ML model is an ASR model; an indication of whether the segment of the audio data of the testing instance input includes one or more particular words or phrases when the given ML model is a hotword detection model; an indication of whether the segment of the audio data of the testing instance input includes a user speaking when the given ML model is a voice activity detection (VAD) model; an indication of whether to keep one or more components of the client device 110 active based on the segment of the audio data of the testing instance input when the given ML model is continued conversation model; and/or other testing input output for any other audio-based ML model.

Also, for example, additionally or alternatively assume that the given ML model stored locally at the client device 110 is a vision-based ML model. In this example, testing instant input for each of the plurality of testing instances can include a corresponding instance of vision data. Further, testing instance output for each of the plurality of testing instances may be based on a type of the vision-based ML model. For instance, the testing instance output can include: one or more ground truth bounding boxes corresponding to one or more objects captured in the instance of the vision data when the given ML model is an object detection model; one or more ground truth labels corresponding to one or more classifications of object captured in the instance of the vision data when the given ML model is an object classification model; an indication of whether a gesture (e.g., lip movement, hand movement, etc.) captured in the instance of the vision data includes one or more particular gestures when the given ML model is a hotword free invocation model; and/or other testing input output for any other vision-based ML model.

Also, for example, additionally or alternatively assume that the given ML model stored locally at the client device 110 is a text-based ML model. In this example, testing instant input for each of the plurality of testing instances can include one or more textual segments. Further, testing instance output for each of the plurality of testing instances may be based on a type of the text-based ML model. For instance, the testing instance output can include ground truth audio data corresponding to the one or more textual segments of the testing instance input when the given ML model is a text-to-speech (TTS) model. Moreover, in implementations where the client device 110 includes an on-device TTS model, these testing instances can additionally or alternatively be utilized as testing instances for any of the audio-based ML models that are stored locally at the client device 110. For instance, the client device 110 can process, using the on-device TTS model, one or more of the textual segments to generate synthesized speech audio data that includes synthesized speech corresponding to the one or more textual segments. The synthesized speech audio data can be utilized as testing instance input, and the testing instance output can be determined based on the one or more textual segments corresponding to the synthesized speech (e.g., the ground truth transcription, the indication of whether the synthesized speech includes one or more of the particular words or phrases, and so on).

In these examples, the on-device performance measure engine 113 can generate the device-specific performance measures (e.g., corresponding latency measures, corresponding memory consumption measures, corresponding CPU measures, and/or other device-specific performance measures) in the same or similar manner based on the processing of the testing instance input. However, the on-device performance measure engine 113 can generate the device-specific performance measures in different manners based on the given ML model that is being evaluated. For example, in implementations where the given ML model is a hotword detection model, the one or more predicted outputs 102 can correspond to a predicted value (e.g., a binary value, a probability, a log likelihood, etc.) that is indicative of whether the audio data of the testing instance input includes one or more particular words or phrases. In this example, the on-device performance measure engine 113 can generate a hotword measure based on comparing the predicted value to a ground truth value indicative of whether the audio data includes one or more of the particular words or phrases included in the one or more testing instance outputs 1018. As another example, in implementations where the given ML model is a TTS model, the one or more predicted outputs 102 can correspond to predicted audio data (or representations of the predicted audio data, such as Mel-filterbank features thereof, Fourier transforms thereof, Mel-cepstral frequency coefficients thereof, and/or other representations of the predicted audio data). In this example, the on-device performance measure engine 113 can generate TTS measure based on comparing the predicted audio data (or representations thereof) to ground truth audio data (or representations thereof) included in the one or more testing instance outputs 1018. Generating the plurality of performance measures based on the plurality of testing instances is described with respect to FIG. 3.

Referring back to FIG. 1A, and as noted above, the on-device performance measure engine 113 can transmit the plurality of performance measures to one or more of the on-device activation engine 114, the on-device sparsification engine 115, and/or the remote system 130 based on the plurality of performance measures 103. In some implementations, the on-device performance measure engine 113 can transmit an indication to the on-device activation engine 114 in response to determining the plurality of performance measures satisfy corresponding performance measure thresholds that indicates a given ML model should be activated or remain active (e.g., as described with respect to FIG. 3). For example, assume that a given ML model being evaluated is a dormant ML model stored locally at the client device 110 (e.g., in the ML model(s) database 1128). Further assume that the on-device performance measure engine 113 determines that the plurality of performance measures satisfy corresponding performance measure thresholds. In this example, the on-device activation engine 114 can activate the dormant ML model for use locally at the client device 110. As another example, assume that a given ML model being evaluated is an active ML model stored locally at the client device 110 (e.g., in the ML model(s) database 1128). Further assume that the on-device performance measure engine 113 determines that the plurality of performance measures satisfy corresponding performance measure thresholds. In this example, the on-device activation engine 114 can keep the active ML model active for use locally at the client device 110.

In additional or alternative implementations, the on-device performance measure engine 113 can transmit the plurality of performance measures to the remote system 130 over the one or more networks 199, and the remote performance measure engine 133 can determine whether a given ML model should be activated or remain active at the client device 110 based on determining whether the plurality of performance measures transmitted to the remote system 130 satisfy the corresponding performance measure thresholds. The remote activation engine 134 can generate and transmit an indication back to the client device 110 over the one or more networks 199 that indicates the given ML should be activated or remain active at the client device 110 (assuming the plurality of performance measures satisfy the corresponding performance measure thresholds). The remote performance measure engine 133 can also consider a plurality of corresponding performance measures generated by additional client devices that share the same set of device characteristics in determining whether the given ML should be activated or remain active at the client device 110 (e.g., one of the groups of additional client devices 140 or 150) as described with respect to FIGS. 3 and 4.

In some implementations, the on-device performance measure engine 113 can transmit an indication the on-device sparsification engine 115 in response to determining one or more of the plurality of performance measures do not satisfy corresponding performance measure thresholds that indicates a given ML model should be sparsified (e.g., as also described with respect to FIG. 3). The on-device sparsification engine 115 can sparsify a given ML model by removing connections, layers, parameters, and/or other features of the given ML model, thereby effectively reducing the size of the given ML model. In sparsifying the dormant ML model, the device-specific performance measures can be reduced (e.g., less latency, less memory consumption, less CPU usage, etc.). However, the model-specific performance measures may be reduced (e.g., less accuracy in precision and/or recall). Notably, the on-device sparsification engine 115 can sparsify a given ML model with varying degrees of sparsity. For example, in response to determining one or more of the plurality of performance measures do not satisfy corresponding performance measure thresholds for a given ML model, the on-device sparsification engine 115 can sparsify the given ML model with a first degree of sparsity by removing first connections, first layers, and/or first parameters. Further, in response to subsequently determining one or more of a plurality of additional performance measures do not satisfy corresponding performance measure thresholds for the sparsified ML model, the on-device sparsification engine 115 can sparsify the given ML model with a second degree of sparsity by further removing second connections, second layers, and/or second parameters. Moreover, in response to subsequently determining one or more of a plurality of further additional performance measures do not satisfy corresponding performance measure thresholds for the further sparsified ML model, the on-device sparsification engine 115 can sparsify the given ML model with a third degree of sparsity by yet further removing third connections, third layers, and/or third parameters. Accordingly, in sparsifying the given ML model, the on-device sparsification engine 115 seeks to balance performance and sparsity of the given ML model for the client device 110.

In additional or alternative implementations, the on-device performance measure engine 113 can transmit an indication to the remote system 130 that requests a sparsified instance of a given ML model in response to determining one or more of the plurality of performance measures do not satisfy corresponding performance measure thresholds. In these implementations, the remote sparsification engine 135 can sparsify the given ML model or obtain a sparsified instance of the given ML model from the remote ML model(s) database 130A. The remote system 130 can transmit the sparsified ML model back to the client device 110, and the client device 110 can further evaluate the sparsified ML model. In additional or alternative implementations, such as when the plurality of performance measures are processed by the remote system 130 as described above, the remote system can determine that the given ML should be sparsified and transmit an indication back to the client device 110 to sparsify the given ML model locally at the client device 110, or transmit a sparsified instance of the given ML model back to the client device 110.

As noted above, in implementations where the remote system 130 is utilized in determining whether to activate to keep active a given ML model, the remote system 130 can also consider a plurality of corresponding performance measures generated by other client devices that have the same set of device characteristics as the client device 110. For example, assume the client device 110 and the first set of additional client devices 140 each have a first set of device characteristics. The first set of device characteristics can include, for example, a first set of hardware characteristics (e.g., a first type of memory available, a first quantity of memory available, a first type of processors, a first quantity of processors, etc.), a first set of software characteristics (e.g., a first firmware, a first operating system, etc.), a first manufacturer characteristic (e.g., an indication of a first manufacturer of the client devices of the group), and/or other device characteristics. Further assume that the second set of additional client devices 150 each have a second set of device characteristics, such that one or more of the first set of hardware characteristics, the first set of software characteristics, or the first manufacturer characteristic differ from that of the client device 110 and the first set of additional client devices 140. In this example, the plurality of corresponding performance measures generated by the first set of additional client devices 140 may influence whether to activate a given ML model at the client device 110, but the plurality of corresponding performance measures generated by the second set of additional client devices 150 may not influence whether to activate the given ML model at the client device 110 based at least in part on the differences in the device characteristics.

By using the techniques described herein, various technical advantages can be achieved. As one non-limiting example, by storing the ML model(s) and the plurality of testing instances for the ML model(s) in on-device memory of the client device(s), consumption of network resources can be reduced by obviating the need to transmit the ML model(s) and the plurality of testing instances to the client device(s). For instance, the client device(s) can already have the ML model(s) and the plurality of training instances stored in the on-device memory when the client device is purchased. As another non-limiting example, by activating (or keeping active) or sparsifying the ML model(s) based on the processing of the plurality of testing instances at the client device(s), consumption of computational resources can be reduced by balancing the performance and the sparsity of the ML model(s). For instance, the ML model(s) can be the optimal ML model(s) for use at the client device(s) based on the device characteristics of the client device(s). As yet another non-limiting example, by activating (or keeping active) or sparsifying the ML model(s) based on the processing of the plurality of testing instances at other client device(s), consumption of computational resources can be reduced by leveraging the plurality of performance measures generated by the other client device(s) that share the same device characteristics. Accordingly, the client device(s) are improved and consumption of computational and/or network resources reduced.

Figure 2:
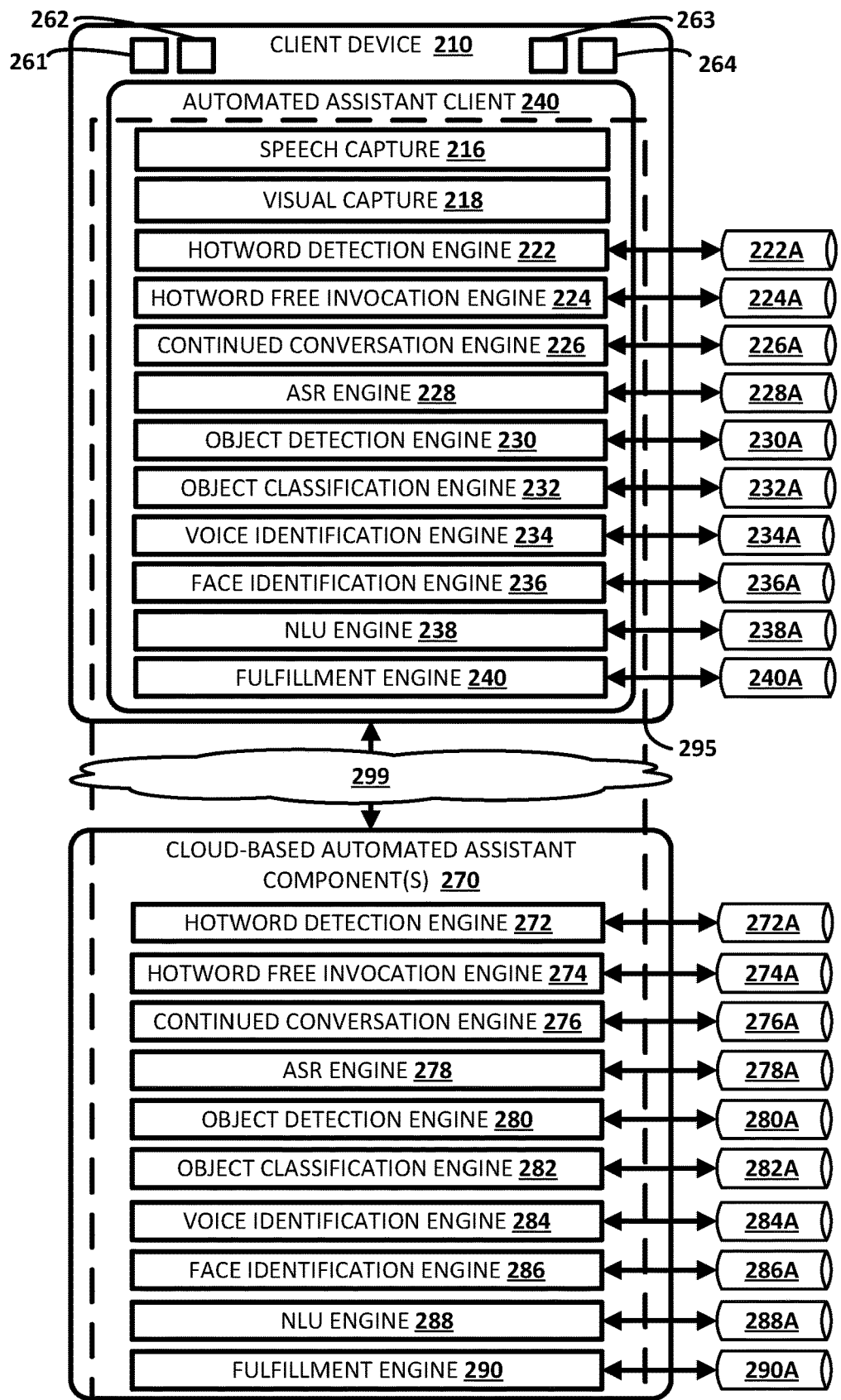
FIG. 2 depicts a block diagram of an example environment that demonstrates various aspects of the present disclosure, and in which implementations disclosed herein can be implemented.

Turning now to FIG. 2, a client device 210 is illustrated in an implementation where various on-device ML engines are included as part of (or in communication with) an automated assistant client 240 is depicted. The respective on-device ML models are also illustrated interfacing with the various on-device ML engines. Other components of the client device 210 are not illustrated in FIG. 2 for simplicity. FIG. 2 illustrates one example of how the various on-device ML engines of and their respective ML models can be utilized by the automated assistant client 240 in performing various actions. For example, the ML engines and their respective ML models can correspond to those that are activated, deactivated, and/or sparsified as described herein (e.g., with respect to FIGS. 1A, 1B, 3, and 4).

The client device 210 in FIG. 2 is illustrated with one or more microphones 261, one or more speakers 262, one or more vision components 263, and display(s) 264 (e.g., a touch-sensitive display). The client device 210 may further include pressure sensor(s), proximity sensor(s), accelerometer(s), magnetometer(s), and/or other sensor(s) that are used to generate other sensor data that is in addition to audio data captured by the one or more microphones 261. The client device 210 at least selectively executes the automated assistant client 240. The automated assistant client 240 includes, in the example of FIG. 2, hotword detection engine 222, hotword free invocation engine 224, continued conversation engine 226, ASR engine 228, object detection engine 230, object classification engine 232, voice identification engine 234, and face identification engine 236. The automated assistant client 240 further includes speech capture engine 216, and visual capture engine 218. It should be understood that the on-device ML engines and on-device ML models depicted in FIG. 2 are provided for the sake of example, and are not meant to be limiting. For example, the automated assistant client 240 can further include additional and/or alternative engines, such as an TTS engine and a respective TTS model, a VAD engine and a respective VAD model, an endpoint detector engine and a respective endpoint detector model, a lip movement engine and a r, and/or other engine(s) along with associated ML model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 210 via one or more of networks 299 (e.g., any combination of LANs, WANs, and/or other networks). The cloud-based automated assistant components 270 can be implemented, for example, via a cluster of high-performance servers. In various implementations, an instance of an automated assistant client 240, by way of its interactions with one or more cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, and/or touch-based interactions).

The client device 210 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 263 can take various forms, such as monographic cameras, stereographic cameras, a LIDAR component (or other laser-based component (s)), a radar component, etc. The one or more vision components 263 may be used, e.g., by the visual capture engine 218, to capture vision data corresponding to vision frames (e.g., image frames, laser-based vision frames) of an environment in which the client device 210 is deployed. In some implementations, such vision frame(s) can be utilized to determine whether a user is present near the client device 210 and/or a distance of the user (e.g., the user's face) relative to the client device 210. Such determination(s) can be utilized, for example, in determining whether to activate the various on-device ML engines depicted in FIG. 2 and/or other on-device ML engine(s). Further, the speech capture engine 218 can be configured to capture a user's spoken utterance(s) and/or other audio data captured via the one or more of the microphones 261.

As described herein, such audio data and other non-microphone sensor data (also referred to as client data) can be processed by the various on-device engines depicted in FIG. 2 to make predictions at the client device 210 using corresponding on-device ML models that are activated, deactivated, and/or sparsified in the manner described above with respect to FIGS. 1A, 1B, 3, and 4.

As some non-limiting example, the hotword detection engine 222 can utilize a hotword detection model 222A to predict whether audio data includes one or more particular words or phrases to invoke the automated assistant 295 (e.g., "Ok Google", "Hey Google", "What is the weather Google?", etc.) or certain functions of the automated assistant 295; the hotword free invocation engine 224 can utilize a hotword free invocation model 224A to predict whether non-microphone sensor data (e.g., vision data) includes a gesture or signal to invoke the automated assistant 295 (e.g., based on a gaze of the user and optionally further based on mouth movement of the user); the continued conversation engine 226 can utilize a continued conversation model 226A to predict whether further audio data is directed to the automated assistant 295 (e.g., or directed to an additional user in the environment of the client device 210); the ASR engine 228 can utilize an ASR model 228A to generate recognized text, or predict phoneme(s) and/or token(s) that correspond to audio data detected at the client device 210 and generate the recognized text based on the phoneme(s) and/or token(s); the object detection engine 230 can utilize an object detection model 230A to predict object location(s) included in vision data captured at the client device 210; the object classification engine 232 can utilize an object classification model 232A to predict object classification(s) of object(s) included in vision data captured at the client device 210; the voice identification engine 234 can utilize a voice identification model 234 to predict whether audio data captures a spoken utterance of one or more users of the client device 210 (e.g., by generating a speaker embedding, or other representation, that can be compared to a corresponding actual embeddings for one or more of the user of the client device 210); and the face identification engine 236 can utilize a face identification model to predict whether vision data captures one or more of the users in an environment of the client device 210 (e.g., by generating an image embedding, or other representation, that can be compared to a corresponding image embeddings for one or more of the user of the client device 210).

In some implementations, the client device 210 may further include natural language understanding (NLU) engine 238 and fulfillment engine 240. The NLU engine 238 may perform on-device natural language understanding, using NLU model 238A, on recognized text, predicted phoneme(s), and/or predicted token(s) generated by the ASR engine 228 to generate NLU data. The NLU data can include, for example, intent(s) that correspond to the spoken utterance and optionally slot value(s) for parameter(s) for the intent(s). Further, the fulfillment engine 240 can generate fulfillment data, using on-device fulfillment model 240A, and based on processing the NLU data. This fulfillment data can define local and/or remote responses (e.g., answers) to spoken utterances provided by a user of the client device 210, interaction(s) to perform with locally installed application(s) based on the spoken utterances, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly), interacting with locally installed applications, transmitting command(s) to IoT device(s), and/or other action(s). In other implementations, the NLU engine 234 and the fulfillment engine 240 may be omitted, and the ASR engine 228 can generate the fulfillment data directly based on the audio data. For example, assume the ASR engine 228 processes, using the ASR model 228A, a spoken utterance of "turn on the lights." In this example, the ASR engine 228 can generate a semantic output that is then transmitted to a software application associated with the lights and/or directly to the lights that indicates that they should be turned on.

Notably, the cloud-based automated assistant component(s) 270 include cloud-based engines 272, 274, 276, 278, 280, 282, 284, 286, 288, and 290 that are counterparts to the on-device engines and respective cloud-based models 272A, 274A, 276A, 278A, 280A, 282A, 284A, 286A, 288A, and 290A that are cloud-based counterparts to the on-device models described herein with respect to FIG. 2. However, in various implementations, these cloud-based engines and cloud-based models may not be invoked since the on-device engines and on-device models may be executed locally at the client device 210. Nonetheless, a remote execution module can also optionally be included that performs remote execution based on local or remotely generated NLU data and/or fulfillment data. Additional and/or alternative remote engines can be included. As described herein, in various implementations, on-device speech processing, on-device image processing, on-device NLU, on-device fulfillment, and/or on-device execution can be used exclusively or prioritized at least due to the latency and/or network usage reductions they provide when resolving a spoken utterance or other user input (due to no client-server roundtrip(s) being needed to resolve the spoken utterance or the other user input). However, one or more cloud-based automated assistant component(s) 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 210), then the more robust resources of the cloud may be utilized to leverage the virtually limitless resources of the cloud.

Turning now to FIG. 3, a flowchart illustrating an example method 300 of causing performance measures to be generated by a client device for activating and/or evaluating on-device machine learning (ML) model(s) is depicted. For convenience, the operations of the method 300 are described with reference to a system that performs the operations. The system of method 300 includes one or more processors and/or other component(s) of a computing device (e.g., client device 110 of FIG. 1, client device 210 of FIG. 2, computing device 610 of FIG. 6, and/or other client devices). Moreover, while operations of the method 300 are shown in a particular order, this is not meant to be limiting. One or more operations may be reordered, omitted, or added.

At block 352, the system determines whether one or more client device conditions are satisfied. The one or more client device conditions can include, for example, one or more of a time of day, a day of week, that the client device is charging, that the client device has at least a threshold state of charge, that a temperature of the client device is less than a temperature threshold, or that the client device is not being held by a user. In other words, the client device may not generate the plurality of performance measures while a user of the client device is actively using the client device. If, at an iteration of block 352, the system determines the one or more client device conditions are not satisfied, then the system continues monitoring for satisfaction of the one or more client device conditions at block 352. If, at an iteration of block 352, the system determines the one or more client device conditions are satisfied, then the system proceeds to block 354. Although block 352 is depicted as occurring at the beginning of the method 300, it should be understood that is for the sake of example and is not meant to be limiting. For example, multiple instances of the operations of block 352 can be utilized before each block to ensure a user of the client device is not actively using the client device.

At block 354, the system causes a client device to generate a plurality of performance measures for a dormant ML model stored locally at the client device, and based on a plurality of testing instances for the dormant ML model that are also stored locally at the client device. The plurality of performance measures can include device-specific performance measures and/or model-specific performance measures. For example, the device-specific performance measures can include a corresponding latency measure (e.g., in seconds or milliseconds), a corresponding memory consumption measure (e.g., a percentage of memory consumed overall or consumed based on processing the testing instances), a corresponding CPU usage measure (e.g., a percentage of CPU usage overall or used in processing the testing instances), and/or other corresponding performance measures associated with performance of the client device in using the dormant ML model to process each of the plurality of testing instances. Also, for example, the model-specific performance measures can include one or more corresponding measures associated with performance of the dormant ML model that can be based on a type of the dormant ML model.

For example, and as indicated at sub-block 354A, the system causes the client device to process, using the dormant ML model, testing instance input for a given testing instance of the plurality of testing instances to generate output. Further, and as indicated at sub-block 354B, the system causes the client device to generate the plurality of performance measures for the given testing instance based on the processing of the testing instance input of the given testing instance. For instance, assume the dormant ML model is a dormant ASR model stored locally on the client device along with a plurality of testing instances for testing the formant ASR model on the client device. Further assume the plurality of testing instances include at least 20 audio-based testing instances that each include a corresponding segment of audio data as testing instance input and a corresponding ground truth transcription for the corresponding segment of the audio data as testing instance output. The system can cause the client device to process, using the dormant ASR model, the corresponding audio segment of the audio data for the first testing instance to generate a plurality of speech hypotheses as predicted output. Further, the system can cause the client device to generate the plurality of performance measure for the first testing instance based on the processing of the testing instance input of the first testing instance. In this instance, the plurality of performance measures can include device-specific performance measures of a corresponding latency measure of the client device in generating the plurality of speech hypotheses based on the first testing instance input, a corresponding memory consumption measure of the client device in generating the plurality of speech hypotheses based on the first testing instance input, a corresponding CPU usage measure of the client device in generating the plurality of speech hypotheses based on the first testing instance input, and/or other device-specific measures. Further, the plurality of performance measures can include model-specific performance measures of a corresponding ASR accuracy measure determined based on comparing one or more of the speech hypotheses to the corresponding ground truth transcription of the testing instance output, a corresponding ASR stability measure that is indicative of how a stable a transcription is for one or more of the speech hypotheses (e.g., how frequently a transcription being visually rendered in a streaming manner at the client device changes), and/or other model-specific performance measures. The system can continue the operations of sub-blocks 354A and 354B to generate the plurality of performance measures for each of the remaining 19 testing instances for the dormant ML model.

At block 356, the system determines, based on the plurality of performance measures, whether to activate the dormant ML model at the client device. In some implementations, the system can cause the client device to determine whether to activate the dormant ML model. In additional or alternative implementations, the system can cause the client device to transmit the transmit the plurality of performance measures for each of the plurality of testing instances to a remote system (e.g., over one or more of the networks 199 of FIG. 1), and the remote system can determine whether the dormant ML model should be activated for use locally at the client device based on the plurality of performance measures. The remote system can transmit an indication back to the client device of whether to activate the dormant ML model at the client device.

The system can determine whether to activate the dormant ML model based on the plurality of performance measures for each of the plurality of testing instances. In some implementations, the system can determine whether to activate the dormant ML model if each of the plurality of performance measures, for each of the plurality of testing instances, satisfies a corresponding performance threshold. For example, and continuing with the above example described with respect to block 354, the system can determine whether to active the dormant ML model based on whether each of the 20 corresponding latency measures satisfy a corresponding latency threshold, whether each of the 20 corresponding memory consumption measures satisfy a corresponding memory consumption threshold, whether each of the 20 corresponding CPU usage measures satisfy a corresponding CPU usage threshold, whether each of the 20 (and optionally more if there are multiple speech hypotheses) corresponding ASR accuracy measures satisfy a corresponding ASR accuracy threshold, whether each of the 20 corresponding ASR stability measures satisfy a corresponding ASR stability threshold, and/or whether other performance measure measures satisfy corresponding performance measures. In additional or alternative implementations, the system can determine whether to activate the dormant ML model based on a statistical analysis of the plurality of performance measures for each of the plurality of testing instances. For example, and continuing with the above example described with respect to block 354, the system can determine whether to active the dormant ML model based on whether an average of the plurality of performance measures satisfy the corresponding performance thresholds (e.g., an average of the corresponding latency measures satisfies the corresponding latency threshold).

If, at an iteration of block 356, the system determines not to activate the dormant ML model, the system proceeds to block 358. At block 358, the system causes the dormant ML model to be sparsified. In some implementations, the dormant ML model can be sparsified locally at the client device or a sparsified instance of the dormant ML model that is also stored locally at the client device can be obtained (e.g., from the ML model(s) database 1128 of FIG. 1). The sparsified dormant ML model can be the same ML model as the dormant ML model utilized by the client device at block 354, but can be of a reduced size. The client device can sparsify the dormant ML model by removing some connections, layers, parameters, and/or other features of the dormant ML model. In sparsifying the dormant ML model, the device-specific performance measures can be reduced (e.g., less latency, less memory consumption, less CPU usage, etc.), but the model-specific performance measures may consequently be reduced (e.g., less accuracy in precision and/or recall). In additional or alternative implementations, the system can cause the client device to transmit a request to a remote system to obtain the sparsified instance of the dormant ML model, and the remote system can transmit the sparsified instance of the dormant ML to the client device.

The system returns to block 352 to perform a subsequent iteration of the method 300. For this subsequent iteration of the method 300, the system can determine whether the one or more client device conditions are still satisfied at a subsequent iteration of block 352. Further, and assuming the one or more client device conditions are satisfied, the system can cause the client device to generate a plurality of additional performance measures for the sparsified dormant ML model based on the same plurality of testing instances. The system can cause the client device to generate the plurality of additional performance measures in the same or similar manner described above with respect to block 354, but using the sparsified dormant ML model rather than dormant ML model at a subsequent iteration of block 354. Moreover, the system can determine whether to activate the sparsified ML model based on the plurality of additional performance measures or determine whether to further sparsify the dormant ML model in the same or similar manner described above with respect to block 356. In other words, the system can cause the client device to iteratively sparsify the dormant ML model (or obtain a sparsified instance of the dormant ML model) in response to determining that the dormant ML model does not perform optimally on the client device, and can continue sparsifying the dormant ML model until an optimal version ML model for the client device is activated.

If, at an iteration of block 356, the system determines to activate the dormant ML model, the system proceeds to block 360. At block 360, the system causes the dormant ML model to be activated for use locally at the client device. The system can use the activated ML model to make one or more predictions locally at the client device based on user input received at the client device (e.g., as described with respect to FIG. 2).

At block 362, the system causes corresponding dormant ML models to be activated for use locally at corresponding additional client devices, each of the corresponding additional client devices having the same device characteristics at the client device. The device characteristics can include, for example, hardware characteristics (e.g., a type of memory available, a quantity of memory available, a type of processors, a quantity of processors, etc.), software characteristics (e.g., firmware, operating system, etc.), a manufacturer characteristic (e.g., an indication of a manufacturer of the client device). In other words, the system can cause other client devices that are substantially the same as the client device to also activate the dormant ML model (or a sparsified instance of the dormant ML model) based on determining to activate the dormant ML model at the client device.

Additionally, or alternatively, the system can skip to operations of block 362 and proceed directly to block 364. At block 364, the system determines whether one or more evaluation conditions are satisfied. The one or more evaluation conditions can include, for example, one or more of a threshold quantity of system updates that have been performed at the client device, a threshold quantity of memory that has been utilized by the client device, a threshold duration of time since a plurality of performance measures for the ML model that is active were generated at the client device, and/or other evaluation conditions. If, at an iteration of block 364, the system determines the one or more evaluation conditions are not satisfied, the system continues to monitor for satisfaction of the one or more evaluation conditions at block 364. If, at an iteration of block 364, the system determines the one or more evaluation conditions are satisfied, the system returns to block 352 to perform a subsequent iteration of the method 300. In other words, the system can periodically evaluate the active ML model (whether the active ML model is the original dormant ML model or a sparsified instance of the original dormant ML model) to ensure the active ML model is still the optimal ML model for the client device.

Figure 4:
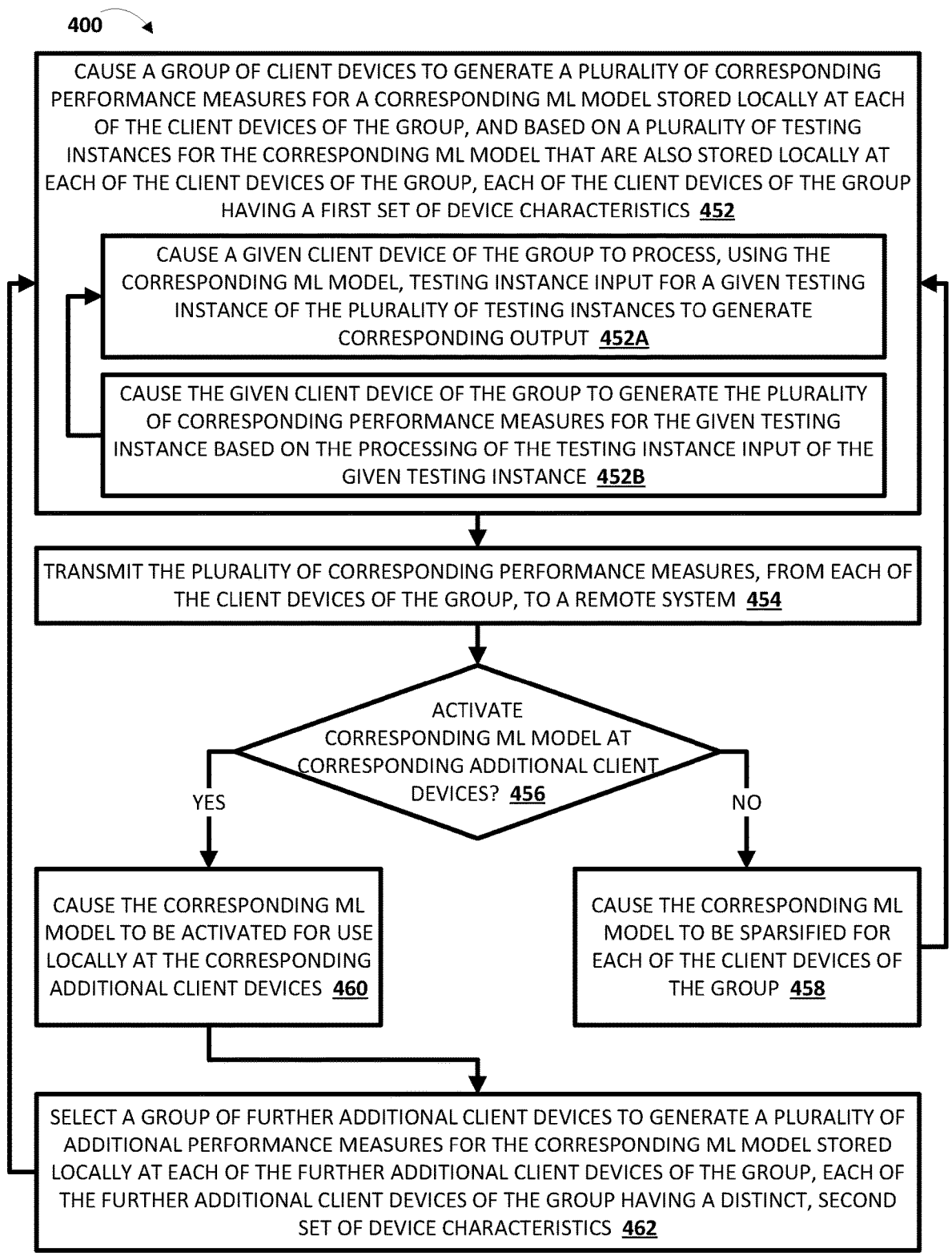
FIG. 4 depicts a flowchart illustrating an example method of causing performance measures to be generated by a group of client devices for activating and/or evaluating corresponding on-device machine learning model(s) at corresponding additional client devices, in accordance with various implementations.

Turning now to FIG. 4, a flowchart illustrating an example method 400 of causing performance measures to be generated by a group of client devices for activating and/or evaluating corresponding on-device machine learning (ML) model(s) at corresponding additional client devices is depicted. For convenience, the operations of the method 400 are described with reference to a system that performs the operations. The system of method 400 includes one or more processors and/or other component(s) of a computing device (e.g., client device 110 of FIG. 1, client device 210 of FIG. 2, computing device 610 of FIG. 6, and/or other computing devices). Moreover, while operations of the method 400 are shown in a particular order, this is not meant to be limiting. One or more operations may be reordered, omitted, or added.

At block 452, the system causes a group of client devices to generate a plurality of corresponding performance measures for a corresponding ML model stored locally at each of the client devices of the group, and based on a plurality of testing instances for the corresponding ML model that are also stored locally at each of the client devices of the group, each of the client devices of the group having a first set of device characteristics. The corresponding ML model stored locally at each of the client devices of the group may be a corresponding dormant ML model or a corresponding active ML model. Further, the plurality of testing instances can be uniform across the client devices of the group. Moreover, the first set of device characteristics can include, for example, a first set of hardware characteristics (e.g., a first type of memory available, a first quantity of memory available, a first type of processors, a first quantity of processors, etc.), a first set of software characteristics (e.g., a first firmware, a first operating system, etc.), a first manufacturer characteristic (e.g., an indication of a first manufacturer of the client devices of the group).

In various implementations, the system causes each of the client devices of the group to generate the plurality of corresponding performance measures in response to determining corresponding client device conditions (e.g., described with respect to block 352 of FIG. 3) are satisfied at each of the client devices. Notably, the one or more client device conditions for a first client device of the group can be satisfied, while the one or more client device conditions for a second client device of the group may not be satisfied. Accordingly, the system can cause each of the client devices of the group to generate the plurality of corresponding performance measures in an asynchronous manner.

For example, and as indicated at sub-block 452A, the system causes a given client device of the group to process, using the corresponding ML model, testing instance input for a given testing instance of the plurality of testing instances to generate corresponding output. Further, and as indicated at sub-block 452B, the system causes the given client device of the group to generate the plurality of corresponding performance measures for the given testing instance based on the processing of the testing instance input of the given testing instance. The system can continue the operations of sub-blocks 452A and 452B to generate the plurality of corresponding performance measures for each of the plurality of testing instances for the corresponding ML model at the given client device. The operations of sub-blocks 452A and 452B can be performed in the same or similar manner described with respect to the operations sub-blocks 354A and 354B of FIG. 3. However, and in contrast with the operations of sub-blocks 354A and 354B of FIG. 3, the operations of sub-blocks 452A and 452B can be performed at each of the client devices of the group.

At block 454, the system transmits the plurality of corresponding performance measures, from each of the client devices of the group, to a remote system. At block 456, the system determines, based on the plurality of corresponding performance measures for each of the client devices of the group, whether to activate the corresponding ML model stored locally at corresponding additional client devices that each also have the first set of device characteristics. In other words, the system can transmit the corresponding plurality of performance measures from each of the client devices to the remote system, and the remote system can determine, based on the corresponding plurality of performance measures received from each of the client devices, whether the corresponding ML models should be activated at other client devices that also have the same device characteristics as those client devices in the group.

In some implementations, each of the client devices of the group can process the corresponding plurality of performance measure locally to determine whether the corresponding ML model satisfies corresponding performance thresholds, and can simply transmit an indication to the remote system of whether the corresponding ML model should be active. In these implementations, the remote system can determine whether to activate the corresponding ML model at the corresponding additional client devices based on a threshold quantity of the client devices in the group (e.g., all of the client devices of the group or a sub-set of the client devices of the group) transmitting an indication to the remote system that indicates the corresponding ML model should be activated. In additional or alternative implementations, the corresponding plurality of performance measures for each of the testing instances at each of the client devices in the group can be transmitted to the remote system, and the remote system can process the corresponding plurality of performance measures for each of the testing instances to determine whether to activate the corresponding ML model at the corresponding additional client devices.

If, at an iteration of block 456, the system determines not to activate the corresponding ML model at the corresponding additional client devices that also have the first set of device characteristics, the system proceeds to block 458. At block 458, the system causes the corresponding ML model to be sparsified for each of the client devices of the group. In some implementations, the remote system can simply transmit an indication to each of the client devices of the group to sparsify the corresponding ML model locally at each of the client devices of the group. In additional or alternative implementations, the remote system can transmit a corresponding sparsified instance of the corresponding ML model to each of the client devices of the group. The system returns to block 452 to perform a subsequent iteration of the method 400 using the corresponding sparsified instance of the corresponding ML model.

If, at an iteration of block 456, the system determines to activate the corresponding ML model at the corresponding additional client devices that also have the first set of device characteristics, the system proceeds to block 460. At block 460, the system causes the corresponding ML model to be activated for use locally at the corresponding additional client devices. In other words, the system can use the client devices included in the group as a proxy for all other client devices having the first set of device characteristics in determining whether and/or when to activate various ML models.

At block 462, the system selects a group of further additional client devices to generate a plurality of additional performance measures for the corresponding ML model stored locally at each of the further additional client devices of the group, each of the further additional client devices of the group having a distinct, second set of device characteristics. In other words, the system can determine the optimal ML model for the client devices having the first set of device characteristics, and then determine the optimal ML model further additional client devices having the second, distinct set of device characteristics, where one or more of the second hardware characteristics, one or more of the second software characteristics, or a second manufacturer characteristic differ from those of the first set of device characteristics. The system can continue performing iterations of the method 400 for various groups of client devices having different sets of device characteristics to ensure the client devices execute the optimal ML models for those client devices. Further, the system can perform iterations of the method 300 of FIG. 3 when one or more evaluation conditions are satisfied at the client devices of the various groups to ensure each of the client devices are executing optimal ML models.

Although FIG. 4 is depicted as determining optimal ML models for the group of client devices having the first set of device characteristics, and subsequently determining optimal ML models for the group of client devices having the distinct, second set of device characteristics, it should be understood that is for the sake of example and is not meant to be limiting. For example, multiple iterations of the method 400 of FIG. 4 can be performed in a parallel manner for multiple groups of client devices having the same sets of device characteristics (e.g., to generate performance measures for different ML models at the multiple groups of client devices having the same set of device characteristics) or distinct sets of device characteristics (e.g., to generate performance measures for the same ML model at the multiple groups of client devices having different sets of device characteristics). For instance, a first group of client devices having a first set of device characteristics can process a first set of testing instances using a first ML model, a second group of client devices having the first set of device characteristics can process a second set of testing instances using a second ML model, a third group of client devices having a distinct, second set of device characteristics can process the first set of testing instances using the first ML model, a fourth group of client devices having the distinct, second set of device characteristics can process the second set of testing instances using the second ML model, and so on.

Figure 5:
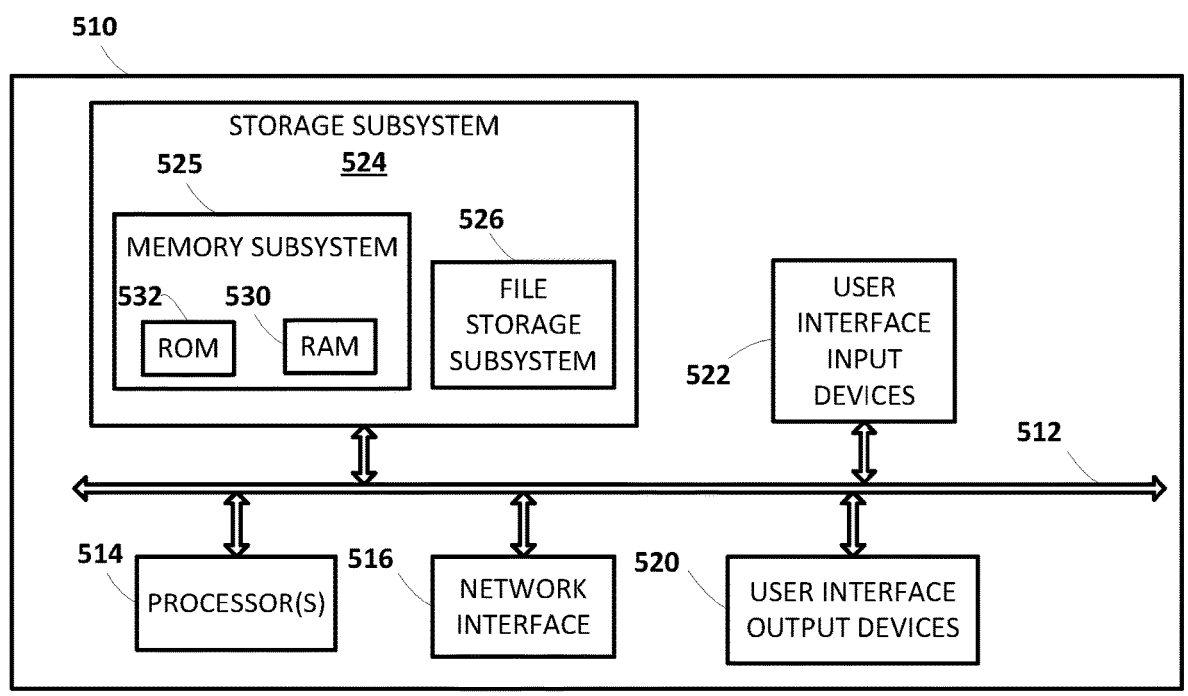
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 13.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes causing a client device to generate a plurality of performance measures for a dormant machine learning (ML) model based on a plurality of testing instances for the dormant ML model. the client device has on-device memory storing the dormant ML model and the plurality of testing instances for the dormant ML model. Further, causing the client device to generate the plurality of performance measures based on a given testing instance, of the plurality of testing instance includes causing the client device to process, using the dormant ML model, testing instance input for the given testing instance to generate output, and causing the client device to generate the plurality of performance measures based on the processing of the testing instance input of the given testing instance. The method further includes determining, based on the plurality of performance measures, whether to activate the dormant ML model at the client device, and in response to determining to activate the dormant ML model at the client device, causing the dormant ML model to be activated for use locally at the client device.

These and other implementations of the technology can include one or more of the following features.

In some implementations, the plurality of performance measures can include, for each of the plurality of testing instances, at least one or more of: a corresponding latency measure, a corresponding memory consumption measure, or a corresponding CPU usage measure.

In some implementations, the method can further include determining whether one or more client device conditions are satisfied. Causing the client device to generate the plurality of performance measures can be in response to determining the one or more client device conditions are satisfied. In some versions of those implementations, the one or more client device conditions can include one or more of: a time of day, a day of week, that the client device is charging, that the client device has at least a threshold state of charge, that a temperature of the client device is less than a temperature threshold, or that the client device is not being held by a user.

In some implementations, the method further includes determining whether one or more evaluation conditions are satisfied, and in response to determining the one or more evaluation conditions are satisfied, causing the client device to generate a plurality of additional performance measures for the active ML model based on the plurality of testing instances. The method can further include determining, based on the plurality of additional performance measures, whether to sparsify the active ML model, and in response to determining to sparsify the active ML model, causing the ML model stored in the on-device memory of the client device to be replaced with a sparsified instance of the ML model. In some versions of those implementations, the one or more evaluation conditions can include one or more of: a threshold quantity of the on-device memory has been consumed by the client device, a threshold quantity of the CPU usage has been exceeded, or a threshold quantity of system updates have been performed.

In some implementations, causing the dormant ML model to be activated for use locally at the client device can include causing the client device to automatically activate the dormant ML model for use locally at the client device.

In some implementations, causing the dormant ML model to be activated for use locally at the client device can include causing the client device to render a notification that indicates the dormant ML model is ready to be activated for use locally at the client device, and causing the dormant ML model to be activated for use locally at the client device in response to receiving user confirmation, responsive to the notification, to activate the dormant ML model.

In some implementations, the client device can have a first set of device characteristics. In some versions of those implementations, the first set of device characteristics can include one or more: a first set of hardware characteristics, a first set of software characteristics, or a first manufacturer. In some additional or alternative versions of those implementations, the method can further include causing one or more additional client devices that also have the first set of device characteristics to activate a corresponding instance of the dormant ML model in response to determining to activate the dormant ML model at the client device.

In some implementations, the method can further include, in response to determining not to activate the dormant ML model at the client device, causing the ML model stored in the on-device memory of the client device to be replaced with a sparsified instance of the ML model, causing the client device to generate a plurality of additional performance measures for the sparsified instance of the ML model based on the plurality of testing instances, and determining, based on the plurality of additional performance measures, whether to activate the sparsified instance of the active model.

In some implementations, the dormant ML model can be a dormant automatic speech recognition (ASR) model, the testing instance input for each of the plurality of testing instances can include a segment of audio data, and testing input output for each of the plurality of testing instances can include a ground truth transcription corresponding to the segment of the audio data. In some versions of those implementations, causing the client device to process, using the dormant ML model, the testing instance input of the given testing instance to generate the output can include causing the client device to process, using the dormant ASR model, the segment of audio data for the given testing instance to generate the output corresponding to one or more speech hypotheses that are predicted to correspond to the segment of the audio data. In some further versions of those implementations, the plurality of performance measures can include, for the given testing instance, at least a corresponding ASR measure determined based on comparing one or more of the speech hypotheses to the ground truth transcription.

In some implementations, the dormant ML model can be a dormant hotword recognition model, the testing instance input for each of the plurality of testing instances can include a segment of audio data, and testing input output for each of the plurality of testing instances can include a ground truth measure of whether the segment of audio data includes one or more particular words or phrases. In some versions of those implementations, causing the client device to process, using the dormant ML model, the testing instance input of the given testing instance to generate the output can include causing the client device to process, using the dormant hotword model, the segment of audio data for the given testing instance to generate the output corresponding to a predicted measure that predicts whether the segment of the audio data includes one or more of the particular words or phrases. In some further versions of those implementations, the plurality of performance measures can include, for the given testing instance, at least a hotword measure determined based on comparing the predicted measure to the ground truth measure.

In some implementations, the dormant ML model can be a dormant text-to-speech (TTS) model, the testing instance input for each of the plurality of testing instances can include a textual segment, and testing input output for each of the plurality of testing instances can include ground truth audio data for the textual segment. In some versions of those implementations, causing the client device to process, using the dormant ML model, the testing instance input of the given testing instance to generate the output can include causing the client device to process, using the dormant TTS model, the textual segment for the given testing instance to generate the output corresponding to predicted audio data that is predicted to correspond to the textual segment. In some further versions of those implementations, the plurality of performance measures can include, for the given testing instance, at least a TTS measure determined based on comparing the predicted audio data to the ground truth audio data.

In some implementations, a method performed by one or more processors of a client device is provided and includes causing a client device to generate a plurality of performance measures for a dormant machine learning (ML) model based on a plurality of testing instances for the dormant ML model. The client device has on-device memory storing the dormant ML model and the plurality of testing instances for the dormant ML model. Further, causing the client device to generate the plurality of performance measures based on a given testing instance, of the plurality of testing instance, can include causing the client device to process, using the dormant ML model, testing instance input for the given testing instance to generate output, and causing the client device to generate the plurality of performance measures based on the processing of the testing instance input of the given testing instance. The method further includes determining, based on the plurality of performance measures, whether to activate the dormant ML model at the client device, and in response to determining not to activate the dormant ML model at the client device, causing the ML model stored in the on-device memory of the client device to be sparsified; and causing the client device to generate a plurality of additional performance measures for the sparsified ML model based on the plurality of testing instances.

In some implementations, a method performed by one or more processors of a client device is provided and includes causing a group client devices to generate a plurality of corresponding performance measures for a corresponding instance of a machine learning (ML) model based on a plurality of testing instances for the ML model. Each client device, in the group of client devices, has corresponding on-device memory storing the corresponding instance of the ML model and the plurality of testing instances for the ML model. Further, each client device, in the group of client devices, has a first set of device characteristics. Moreover, causing a given client device, included in the group of client devices, to generate the plurality of corresponding performance measures based on a given testing instance, of the plurality of testing instance, include causing the given client device to process, using the corresponding instance of the ML model, testing instance input for the given testing instance to generate corresponding output, and causing the given client device to generate the plurality of corresponding performance measures based on the processing of the testing instance input of the given testing instance. The method further includes determining, based on the plurality of corresponding performance measures, whether to activate additional instances the ML model at a plurality of additional client devices that also have the first set of device characteristics, and in response to determining to activate the additional instances of the ML model at the plurality of additional client devices, causing the additional instances of the ML model to be activated for use locally at each of the additional client devices.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a client device, the method comprising:
    causing the client device to generate a plurality of performance measures for a dormant machine learning (ML) model based on a plurality of testing instances for the dormant ML model,
        wherein the client device has a first set of device characteristics,
        wherein the first set of device characteristics includes at least a first set of hardware characteristics,
        wherein the client device has on-device memory storing the dormant ML model and the plurality of testing instances for the dormant ML model, and
        wherein causing the client device to generate the plurality of performance measures based on a given testing instance, of the plurality of testing instance, comprises:
            causing the client device to process, using the dormant ML model, testing instance input for the given testing instance to generate output; and
            causing the client device to generate the plurality of performance measures based on the processing of the testing instance input of the given testing instance;
    determining, based on the plurality of performance measures, whether to activate the dormant ML model at the client device, that has the first set of device characteristics, as an active ML model; and
    in response to determining to activate the dormant ML model at the client device:
        causing the dormant ML model to be activated for use locally at the client device as the active ML model; and
        causing one or more additional client devices, that also have the first set of device characteristics, to utilize a corresponding instance of the dormant ML model for respective use, locally at the one or more additional client devices, as a corresponding instance of the active ML model.

2. The method of claim 1, wherein the plurality of performance measures include, for each of the plurality of testing instances, at least one or more of: a corresponding latency measure, a corresponding memory consumption measure, or a corresponding CPU usage measure.

3. The method of claim 1, further comprising:
    determining whether one or more client device conditions are satisfied; and
    wherein causing the client device to generate the plurality of performance measures is in response to determining the one or more client device conditions are satisfied.

4. The method of claim 3, wherein the one or more client device conditions include one or more of: a time of day, a day of week, that the client device is charging, that the client device has at least a threshold state of charge, that a temperature of the client device is less than a temperature threshold, or that the client device is not being held by a user.

5. The method of claim 1, further comprising:
    determining whether one or more evaluation conditions are satisfied; and
    in response to determining the one or more evaluation conditions are satisfied:
        causing the client device to generate a plurality of additional performance measures for the active ML model based on the plurality of testing instances;
        determining, based on the plurality of additional performance measures, whether to sparsify the active ML model; and
        in response to determining to sparsify the active ML model:
            causing the active ML model stored in the on-device memory of the client device to be replaced with a sparsified instance of the active ML model.

6. The method of claim 5, wherein the one or more evaluation conditions include one or more of: a threshold quantity of the on-device memory has been consumed by the client device, a threshold quantity of the CPU usage has been exceeded, or a threshold quantity of system updates have been performed.

7. The method of claim 1, wherein causing the dormant ML model to be activated for use locally at the client device as the active ML model comprises:
    causing the client device to automatically activate the dormant ML model for use locally at the client device as the active ML model.

8. The method of claim 1, wherein causing the dormant ML model to be activated for use locally at the client device as the active ML model comprises:
    causing the client device to render a notification that indicates the dormant ML model is ready to be activated for use locally at the client device as the active ML model; and
    causing the dormant ML model to be activated for use locally at the client device as the active ML model in response to receiving user confirmation, responsive to the notification, to activate the dormant ML model.

9. The method of claim 1, and wherein the first set of device characteristics further includes one or more: a first set of software characteristics, or a first manufacturer.

10. The method of claim 1, further comprising:
    in response to determining not to activate the dormant ML model at the client device:
        causing the dormant ML model stored in the on-device memory of the client device to be replaced with a sparsified instance of the dormant ML model;
        causing the client device to generate a plurality of additional performance measures for the sparsified instance of the dormant ML model based on the plurality of testing instances; and
        determining, based on the plurality of additional performance measures, whether to activate the sparsified instance of the dormant ML model at the client device as a sparsified instance of an active ML model.

11. The method of claim 1, wherein the dormant ML model is a dormant automatic speech recognition (ASR) model, wherein the testing instance input for each of the plurality of testing instances includes a segment of audio data, and wherein testing input output for each of the plurality of testing instances includes a ground truth transcription corresponding to the segment of the audio data.

12. The method of claim 11, wherein causing the client device to process, using the dormant ML model, the testing instance input of the given testing instance to generate the output comprises:

causing the client device to process, using the dormant ASR model, the segment of audio data for the given testing instance to generate the output corresponding to one or more speech hypotheses that are predicted to correspond to the segment of the audio data.

13. The method of claim 12, wherein the plurality of performance measures include, for the given testing instance, at least a corresponding ASR measure determined based on comparing one or more of the speech hypotheses to the ground truth transcription.

14. The method of claim 1, wherein the dormant ML model is a dormant hotword recognition model, wherein the testing instance input for each of the plurality of testing instances includes a segment of audio data, and wherein testing input output for each of the plurality of testing instances includes a ground truth measure of whether the segment of audio data includes one or more particular words or phrases.

15. The method of claim 14, wherein causing the client device to process, using the dormant ML model, the testing instance input of the given testing instance to generate the output comprises:

causing the client device to process, using the dormant hotword model, the segment of audio data for the given testing instance to generate the output corresponding to a predicted measure that predicts whether the segment of the audio data includes one or more of the particular words or phrases.

16. The method of claim 15, wherein the plurality of performance measures include, for the given testing instance, at least a hotword measure determined based on comparing the predicted measure to the ground truth measure.

17. A method implemented by one or more processors of a client device, the method comprising:

causing the client device to generate a plurality of performance measures for a dormant machine learning (ML) model based on a plurality of testing instances for the dormant ML model, wherein the client device has a first set of device characteristics, wherein the first set of device characteristics includes at least a first set of hardware characteristics, wherein the client device has on-device memory storing the dormant ML model and the plurality of testing instances for the dormant ML model, and wherein causing the client device to generate the plurality of performance measures based on a given testing instance, of the plurality of testing instance, comprises:

causing the client device to process, using the dormant ML model, testing instance input for the given testing instance to generate output; and causing the client device to generate the plurality of performance measures based on the processing of the testing instance input of the given testing instance;

determining, based on the plurality of performance measures, whether to activate the dormant ML model at the client device, that has the first set of device characteristics, as an active ML model;

in response to determining not to activate the dormant ML model at the client device:

causing the dormant ML model stored in the on-device memory of the client device to be replaced with a sparsified instance of the dormant ML model; and causing the client device to generate a plurality of additional performance measures for the sparsified instance of the dormant ML model based on the plurality of testing instances;

determining, based on the plurality of additional performance measures, whether to activate the sparsified instance of the dormant ML model at the client device, that has the first set of device characteristics, as the active ML model; and in response to determining to activate the sparsified instance of the dormant ML model at the client device:

causing the sparsified instance of the dormant ML model to be activated for use locally at the client device as the active ML model; and causing one or more additional client devices, that also have the first set of device characteristics, to utilize a corresponding instance of the sparsified instance of the dormant ML model for respective use, locally at the one or more additional client devices, as a corresponding instance of the active ML model.

18. A method implemented by one or more processors of a remote system, the method comprising:

causing a group client devices to generate a plurality of corresponding performance measures for a corresponding instance of a machine learning (ML) model based on a plurality of testing instances for the ML model, wherein each client device, in the group of client devices, has corresponding on-device memory storing the corresponding instance of the ML model and the plurality of testing instances for the ML model, wherein each client device, in the group of client devices, has a first set of device characteristics, wherein the first set of device characteristics includes at least a first set of hardware characteristics, and wherein causing a given client device, included in the group of client devices, to generate the plurality of corresponding performance measures based on a given testing instance, of the plurality of testing instance, comprises:

causing the given client device to process, using the corresponding instance of the ML model, testing instance input for the given testing instance to generate corresponding output; and causing the given client device to generate the plurality of corresponding performance measures based on the processing of the testing instance input of the given testing instance;

determining, based on the plurality of corresponding performance measures, whether to activate additional instances the ML model at a plurality of additional client devices that also have the first set of device characteristics; and in response to determining to activate the additional instances of the ML model at the plurality of additional client devices:

causing the additional instances of the ML model to be activated for use locally at each of the additional client devices.

* * * * *